United States Patent [19]

Karpiuk

[11] Patent Number: 4,826,240

[45] Date of Patent: May 2, 1989

[54] ADJUSTABLE SEAT

[76] Inventor: Andrew Karpiuk, 222 Wenonah Place #3, West Palm Beach, Fla. 33405

[21] Appl. No.: 821,819

[22] Filed: Jan. 23, 1986

[51] Int. Cl.⁴ ........................ A61H 3/00; F16M 13/08

[52] U.S. Cl. .......................................... 297/6; 135/67; 272/70.3; 297/335

[58] Field of Search ...................... 297/5, 6, 148, 150, 297/335; 135/67; 272/70.3

[56] References Cited

U.S. PATENT DOCUMENTS 1,971,583 8/1934 Skinner .................................. 297/6
2,258,488 10/1941 Gaverth ................................ 297/6
3,354,893 11/1967 Schmerl ............................... 135/67
3,408,104 10/1968 Raynes ........................ 248/206.5 X
3,813,714 6/1974 Sater .............................. 297/148 X
4,162,101 7/1979 McCague, Sr. et al. ...... 272/70.3 X

*Primary Examiner*—Kenneth J. Dorner
*Assistant Examiner*—Peter R. Brown

[57] ABSTRACT

A seat assembly for use with a conventional walker is designed to be adjustably attached to walkers of different shapes and sizes. Once the seat assembly is attached to a walker, the seat may be moved up into an inoperative position and held there by magnets. When a user of the walker wished to sit down, the foldable seat may be pulled downwardly into an operative position to facilitate the user's desires.

5 Claims, 4 Drawing Sheets

ADJUSTABLE SEAT

BACKGROUND OF THE INVENTION

1. Field of the Invention

This present invention relates to foldable seats, and more particularly pertains to a foldable seat supported from the four legs of a walker which includes a seat member swingable from an upstanding forwardly disposed inoperative position to a horizontal position to establish a seat upon which a user of the walker may be seated.

2. Description of Prior Art

There are different forms of foldable seats known in the prior art which include some of the appearance, structural and operational features of the present invention. In this respect, reference is made to the following U.S. Des. Pat. Nos. 136,745; 183,908; 235,983; 240,214; 246,036; 264,404; 277,561; 2,205,978; and 2,374,182. These patents are illustrative of the current state of the art with respect to the subject matter of the present invention. As will be noted with reference to the above-listed patents, the prior art foldable seats are replete with many problems and disadvantages. For example, they are typically designed so as to not be adaptable for attachment to various types of devices, and further, they quite often utilize ineffective attachment means which limit both their ease of attachment to a supporting structure, as well as their reliability to remain attached thereto. Further, little or no provision is made for the easy and efficient movement of a foldable seat into operative and inoperative positions without the necessity of substantial activity on the part of a user. As such, it can be appreciated that there is a substantial need for improvement in these prior art foldable seat constructions and in this respect, the present invention substantially fulfills this need.

SUMMARY OF THE INVENTION

In view of the foregoing disadvantages inherent in the foldable seats now available in the prior art, and in order to solve such difficulties, the present invention provides an improved foldable seat construction which is both novel and efficient.

More particularly, the walker seat of the instant invention is constructed in a manner whereby it may be readily mounted from the four legs of a conventional walker and defines a horizontal seat portion selectively swingable therefrom to an upstanding foldable position closely paralleling the plane in which the front legs of the walker are disposed. Magnetic means are provided for retaining the seat portion in the raised inoperative position, and the magnetic means enable the user of the associated walker to readily swing the seat portion to the horizontal operative position, or from the operative position to the raised inoperative position, without having to manipulate catches, latches, or other types of holding assemblies.

The walker seat is further constructed in a manner adapting the seat for operative support from different models of walkers and incorporates a mounting structure which allows for expected variations in the construction of these different models.

It is therefore an object of the present invention to provide a seat construction for use in conjunction with a walker which will enable the user of the walker, at any time he or she desires, to swing a seat from a raised inoperative position to a lowered horizontal position in which the seat is securely mounted to the walker, and to thereafter use the seat for assuming a seated position.

Another object of the invention is to provide a walker seat including structural and operational features which do not interfere with normal usage of the walker when the seat portion of the walker seat is in the raised inoperative position.

Still another object of the invention is to provide a walker seat constructed in a manner whereby it may be operatively mounted from different models of walkers.

A further object of the invention is to provide a walker seat including structural features enabling operative mounting of the walker seat from a walker even if the front and rear legs of the walker are spaced at different distances apart.

Even still another object of the invention is to provide a walker seat including a seat portion which may be swung upwardly from a horizontal seat defining position to an upstanding inoperative position closely paralleling the plane of the front legs of the associated walker.

Yet another object of the invention is to provide a walker seat in accordance with the immediately preceding object and including magnetic means for releasably retaining the seat portion in the raised inoperative position.

It is a further object of the present invention to provide a new and improved foldable seat construction which has all of the advantages of the prior art foldable seat constructions and none of the disadvantages.

It is yet another object of the present invention to provide a new and improved foldable seat construction which may be easily and efficiently manufactured and marketed, and which is of a durable and rugged construction.

Still yet another object of the present invention is to provide a new and improved foldable seat assembly which is characterized by a portable and lightweight construction, whereby the same can be conveniently transported, stored and assembled for use.

An even further object of the present invention is to provide a new and improved foldable seat construction which is susceptible of a low cost to manufacture with regard to both materials and labor, and which accordingly is then susceptible of low prices of sale to the consuming public, thereby making such device economically available to the buying public.

Even still another object of the present invention is to provide a new and improved foldable seat construction which provides in the apparatuses and methods of the prior art some of the advantages thereof, while simultaneously overcoming some of the disadvantages normally associated therewith.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the purposes of the present invention. It is important, therefore, that the claims be regarded as including such equivalent constructions so far as they do not depart from the spirit and scope of the present invention.

Accordingly, the above objects, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other then those set forth above will become apparent when consideration is given to the following detailed description thereof. Such description makes reference to the annexed drawings wherein.

DESCRIPTION OF THE PREFERRED EMBODIMENT

Figure 1:
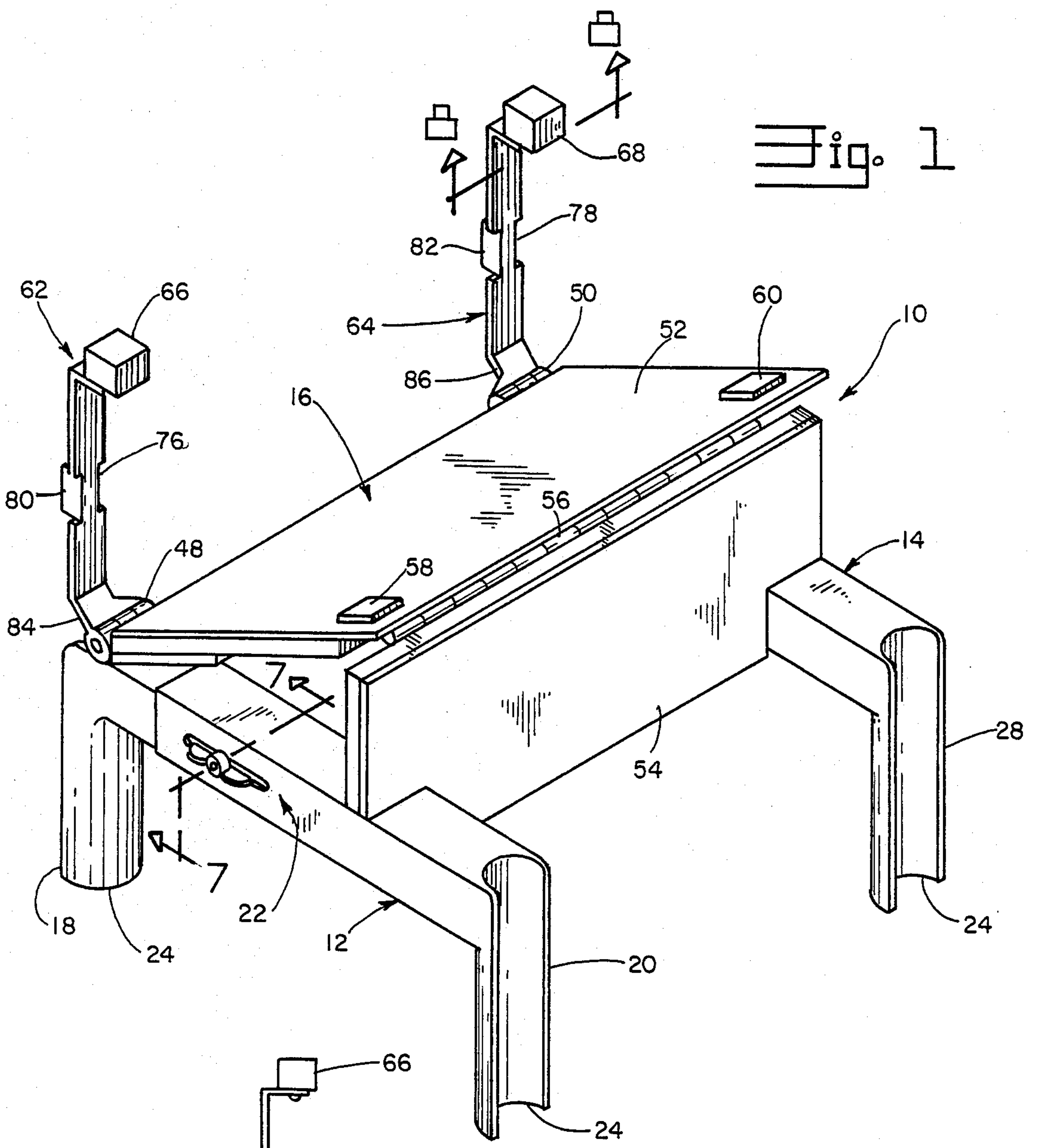
FIG. 1 is a perspective view of the walker seat comprising the present invention with the seat portion thereof arranged in a partially raised position.
Figure 2:
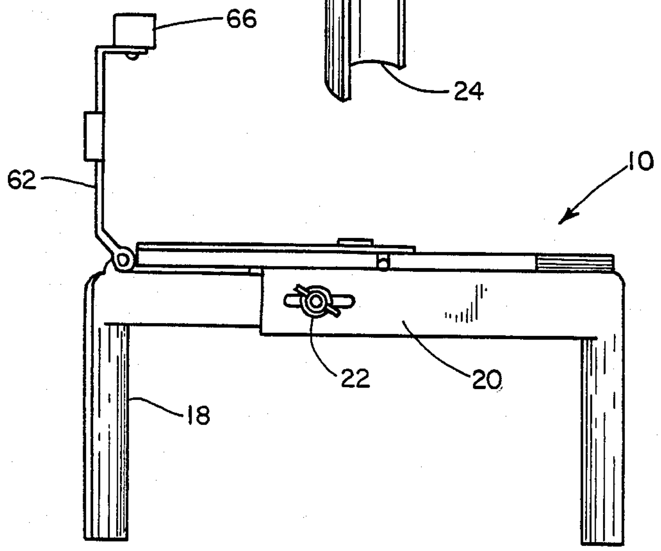
FIG. 2 is a left side elevational view of the walker seat with the seat portion thereof in a fully operative position.
Figure 3:
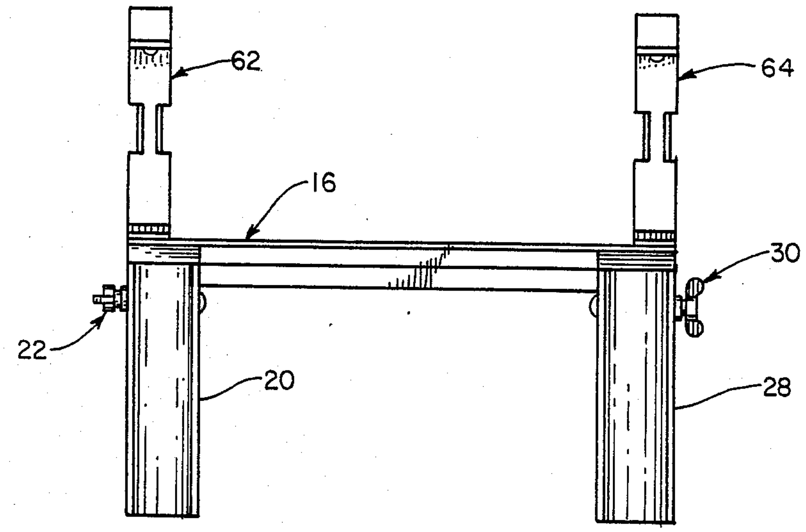
FIG. 3 is a front elevational view of the assembly illustrated in FIG. 2.
Figure 4:
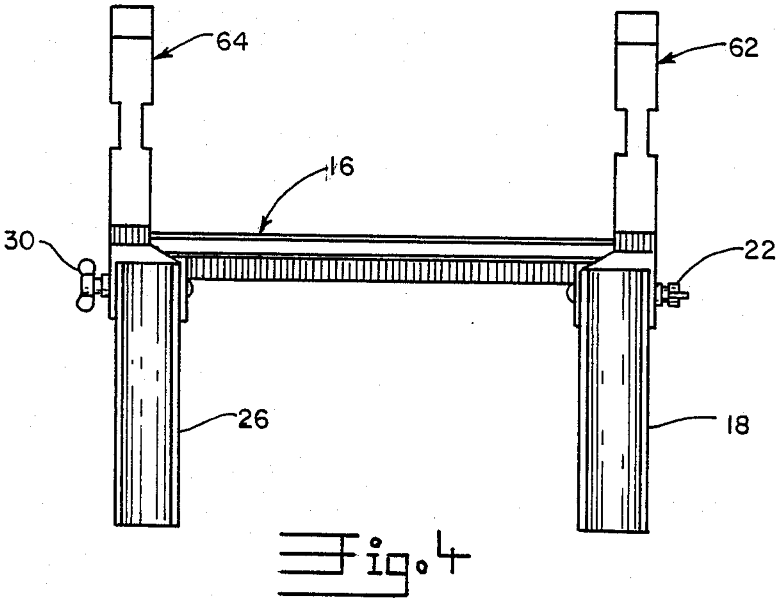
FIG. 4 is a rear elevational view of the assembly illustrated in FIG. 2.
Figure 5:
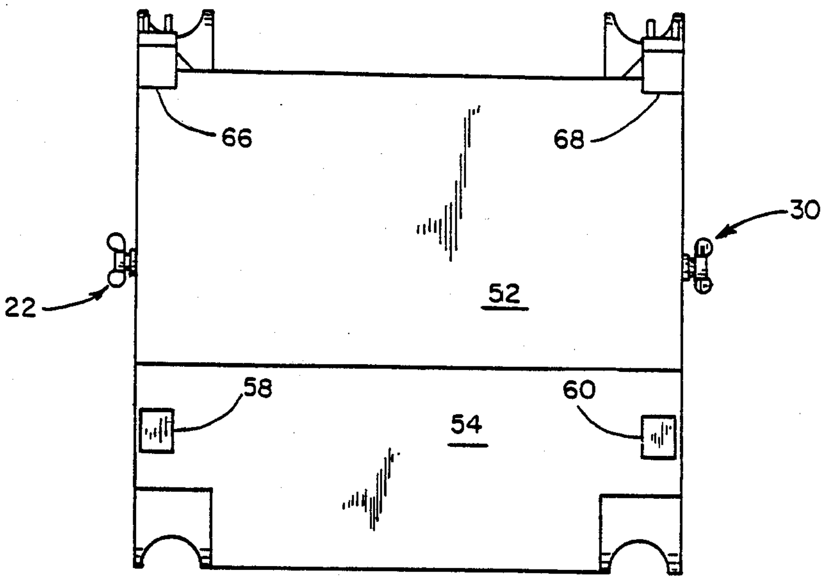
FIG. 5 is a top plan view of the assembly illustrated in FIG. 2.
Figure 6:
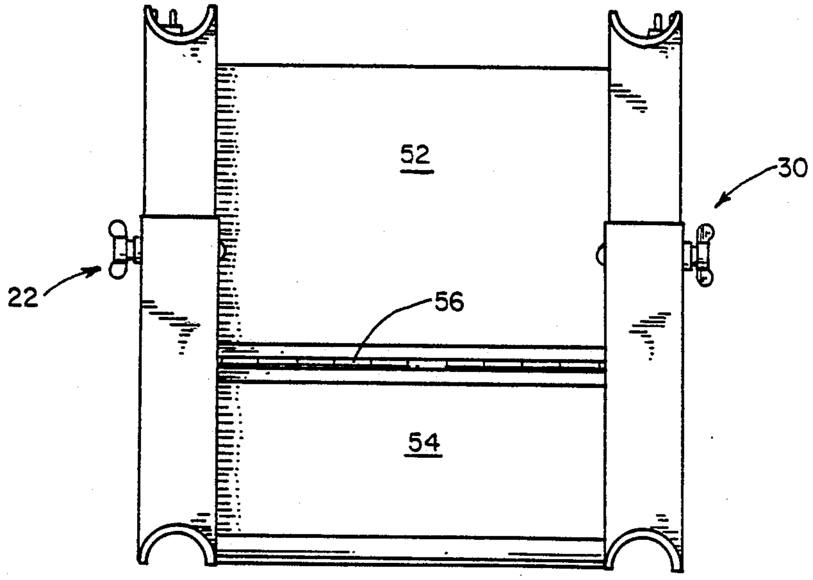
FIG. 6 is a bottom plan view of the assembly illustrated in FIG. 2.

With reference now to the drawings and in particular to FIGS. 1-6 thereof, a new and improved foldable walker seat assembly embodying the principles and concepts of the present invention and generally designated by the reference numeral 10 will be described. More specifically, the walker seat 10 generally comprises a pair of support sections 12, 14 which are of an interconnected, spaced-apart, paralleledly aligned construction. In this respect, the support sections 12, 14 are rigidly held together by a seat member 16 which is pivotally attached to each of the individual support sections.

As clearly illustrated in the drawings, support section 12 is comprised of a pair of orthogonally-shaped members 18, 20 which are retained together by a locking means 22. One free end of the member 20 is of a hollow rectangularly-shaped construction and is designed to receive a free end of the member 18, whereby the members are telescopingly retained together and are movable relative to one another. The locking means 22, which will be described subsequently in greater detail, may then be employed to lockingly engage the members 18, 20 together at a desired position.

With continuing reference to the drawings, it will be noted that the remaining free ends of the members 18, 20 are of a curvilinear, channel-shaped construction with this design being employed to facilitate an engagement of these curvilinear ends with the conventional existing legs of a walker. The bottom portions 24 of each of these curvilinearly-shaped ends of the members 18, 20 are designed to rest upon the conventional preexisting cross support bars found on most walkers, thereby to facilitate a retention of the walker seat 10 at a desired position relative thereto.

With respect to the symmetry of the present invention, it is to be understood that the structure of the support section 12 is essentially identical to the construction of the support section 14, wherein the latter section also comprises orthogonally-shaped members 26, 28 telescopingly retained together and having a further locking means 30 associated therewith. Accordingly, it is to be understood that any discussion relative to the construction of the support section 12 also directly applies to the construction of the support section 14.

Figure 7:
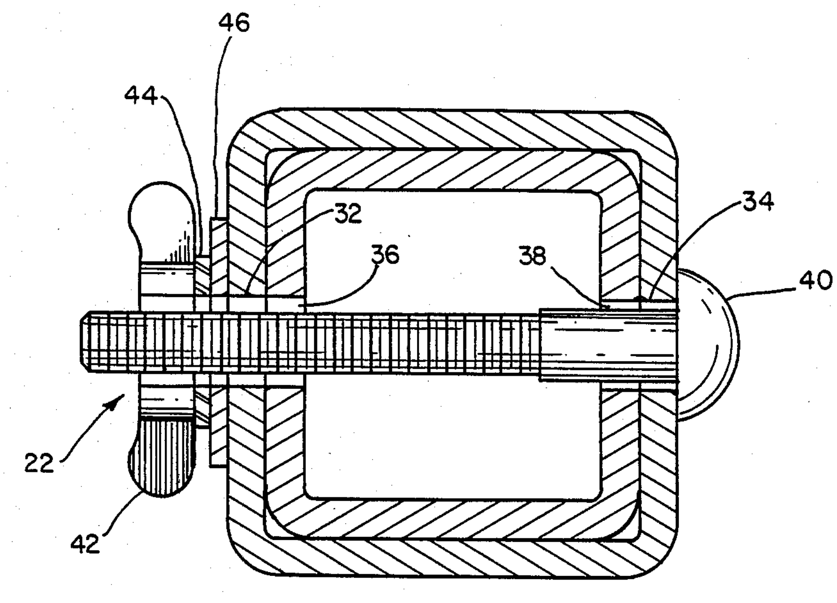
FIG. 7 is an enlarged fragmentary vertical sectional view taken substantially upon the plane indicated by the section line 7—7 of FIG. 1.

As to the structure of the locking means 22, 30, a discussion thereof will be provided with reference only to support section 12. More specifically, referring to FIG. 7 in conjunction with FIG. 1, it will be noted that the attachment member 20 may include a pair of longitudinal slots 32, 34 on opposed sidewall portions thereof, while the corresponding member 18 may be provided with a pair of oppositely disposed apertures 36, 38, whereby a threaded fastening means 40 may be directed concurrently through all of the slots and apertures. An internally threaded member, such as wingnut 42, may then be selectively attached to the threaded fastener 40, while appropriate washers 44, 46 may also be employed in a conventional and well known manner. As is well understood in the art, the washer 44 would most likely be a lock washer, thereby to prevent an unthreading of the wingnut 42 from the bolt 40 after the locking means 22 has been tightly fastened. Again, it is to be pointed out that the locking means 30 associated with the support section 14 is of an opposed and similar construction to the locking means 22, whereby no discussion thereof need be provided.

With respect to the construction of the seat member 16, it will be noted that this member is attached at a single point to the respective attachment members 18, 26, with such attachment being afforded by the use of respective hinge members 48, 50. As such, the seat member 16 is pivotally movable with respect to the support sections 12, 14, while still serving as the interconnection means therebetween, thus to hold the support sections in a desired fixed relationship relative to one another.

Additionally, it will be noted that the seat member 16 is essentially constructed from two separate panels 52, 54 which are pivotally attached to one another by an elongated hinge member 56. FIG. 1 shows the panels 52, 54 partially moved together, thereby to illustrate the pivotal flexibility of the seat member 16. Additionally, a pair of magnet plates 58, 60 are shown as being fixedly secured to a topmost surface of the panel 52, with these magnet plates being operable to retain the seat member 16 in a folded, upstanding inoperable position as will be subsequently described.

As best illustrated in FIGS. 1-4, the walker seat 10 comprising the present invention further includes a pair of seat support members 62, 64 which are respectively pivotally attached to the attachment members 18, 26. In this regard, these seat support members 62, 64 are attached to the respective hinges 48, 50 to which the seat panel 52 is also attached.

Figure 8:
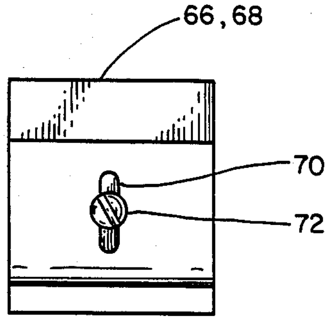
FIG. 8 is an enlarged horizontal sectional view taken substantially upon the plane indicated by the section line 8—8 of FIG. 1.

With respect to the construction of the seat support members 62, 64, it will h=noted that the remaining free ends thereof may have adjustably mounted magnets 66, 68 respectively attached thereto. In this regard, reference is made to FIG. 8 wherein it can be determined that a bottom portion of the free end of either support member 62, 64 may include a slot 70, while a threaded fastener 72 may then be directed through the slot to engage with an internally threaded aperture associated with either of the magnets 66, 68. As such, a loosening or tightening of the threaded fastener 72, as desired, will facilitate a relative movement of the respective magnets 66, 68 with respect to their seat support members 62, 64, thereby to permit their positioning at a desired location.

A further noteworthy feature of the seat support members 62, 64 is the respective guide slot structures 76, 78 which are designed to facilitate a retention of a conventional holding clamp or band between the seat support members and the existing legs of a walker. The recessed structure of these slots 76, 78 prevents an attachment band, which is threadably tightenable in a known manner, from sliding upwardly or downwardly on the respective seat support members 62, 64. Additionally, the guide slots 76, 78 may be constructed to include an outwardly extending, increased width portion, respectively numbered 80, 82, which operates to directly abut against existing walker legs. Inasmuch as the construction of a conventional walker results in the legs being sloped at an angle, as opposed to being substantially perpendicular to an existing floor surface, the increased width portions 80, 82 limit the abutment points of the respective seat support member 62, 64 to a small contact area, thereby to facilitate the attachment thereof to the legs by means of the aforementioned, unillustrated band clamps. More specifically, without the increased width portions 80, 82, it is highly unlikely that the seat support members 62, 64 would exactly paralleledly align with the existing legs of a walker, and this could result in some instability of attachment.

A final noteworthy feature of the invention comprises the fact that the seat support members 62, 64 include respective angulated leg portions 84, 86, with this illustrated angle of bend being designed to accommodate an attachment of the walker seat 10 to various known constructions of walkers now on the market. The angulated sections 84, 86 facilitate the attachment of the respective seat support members 62, 64 to the hinges 48, 50, while providing for a desired parallel alignment of the seat support members with existing walker legs.

With reference to the manner of operation of the present invention, it can be appreciated that a user thereof need only to loosen the respective locking means 22, 30 so as to facilitate relative telescoping movement between the respective attachment members 18, 20 and 26, 28. Once the locking means 22, 30 have been released, the support sections 12, 14 may be positioned between the existing legs of a conventional walker, and may then be telescoped outwardly until the curvilinear, channel-shaped ends of the attachment members 18, 20, 26, 28 are respectively in engagement with the four walker legs. Once this engagement has been achieved, the locking means 22, 30 may be securely tightened, with the bottommost ends 24 of the channel-shaped portions of the members 18, 20, 26, 28 then resting on the pre-existing cross support members associated with the conventional walker. With these bottom ends 24 resting on such cross members, it can be appreciated that the walker seat assembly 10 can not slide downwardly relative to the walker when a user thereof is seated thereon.

Continuing with a description of the manner of operation of the invention, a user thereof will next attach the seat support members 62, 64 to the two rearwardly-positioned legs of the conventional walker, with such attachment being accomplished through the use of the aforediscussed unillustrated band clamps which are positionable around the legs and the respective guide slots 76, 78. After this attachment has been completed, the seat member 16 may be folded upwardly into a vertical inoperable position, whereby the magnets 58, 60 will engage with the respective magnets 66, 68 to retain the seat in this upwardly folded position. When a user of the walker desires to be seated, he need only to manually disengage the seat member 16 from the magnets 66, 68, and the seat will then fold outwardly whereby the panel members 52, 54 are aligned in the same horizontal plane. Once the panel members 52, 54 are horizontally aligned, they define the seat 16 upon which the user may sit.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and manner of operation shown and described, and accordingly, all suitable modifications and equivalents may be resorted to, falling within the scope of the invention.

What is claimed as being new and desired to be protected by Letters Patents of the United Sates is as follows:

1. An adjustable, foldable seat assembly for an invalid walker, comprising:

a. a seat means having an operative horizontal position and an inoperative vertical position, said seat means having a front and rear section pivotally connected to one another thereby allowing the folding of the two sections when said seat means is in said inoperative vertical position;

b. a seat support means for supporting said seat means in said operative horizontal position, said seat support means being pivotally attached to said rear section of said seat means thereby allowing said seat means to assume either said inoperative vertical position or said operative horizontal position, said seat support means having two sections aligned in parallel and separated by approximately the width of the seat means, said seat support means sections extending from the front to the rear of the walker and engaging both front and rear legs of the walker, said seat support means sections having front and rear members slidably disposed with respect to one another thereby allowing the front to rear distance of said seat support means to be varied;

c. a vertical seat attachment means, comprising a pair of elongated members having a substantially rectangular shape, said pair of elongated members being pivotally attached to the rear of said rear members of said seat support means sections, said pair of elongated members having a means for being secured to the rear legs of the walker, said pair of elongated members further having a means for securing said seat means in said inoperative vertical position.

2. An adjustable, foldable seat assembly for an invalid walker as described in claim 1, wherein each of the ends of said seat support means sections which engage the legs of the walker consists of a member extending vertically downward and resting on a crossbar of the walker, said downward extending member having a curvillinear notch which facilitates the engagement of said seat support sections to the curvilinear shaped legs of a conventional walker.

3. An adjustable, foldable seat assembly for an invalid walker as described in claim 1 or claim 2 wherein said slidably disposed front and rear members of said seat support means sections have a hollow rectangular shape thereby allowing the telescoping of said front and rear members.

4. An adjustable, foldable seat assembly for an invalid walker as described in claim 3 and further including a locking means for retaining said telescoping members in selectively locked engagement.

5. An adjustable, foldable seat assembly for an invalid walker as described in claim 4 wherein a pair of magnets are secured to the top surface of said rear section of said seat means, and wherein said vertical seat attachment means members each having a magnet secured thereon to engage said magnets on the surface of said seat means and thereby hold said seat means in said inoperative vertical position, and wherein said vertical seat attachment means members have a pair of slots indented into their outer edges to prevent an attachment means from sliding along said vertical seat attachment means members.

* * * * *